Patented Apr. 18, 1933

1,903,860

UNITED STATES PATENT OFFICE

HEINRICH GOCKEL, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PREPARATION OF METALLIC COATINGS

No Drawing. Application filed April 3, 1931, Serial No. 527,621, and in Germany April 24, 1930.

The present invention relates to baths used in the preparation of metallic coatings on metals or metallically conducting surfaces, such as, for instance, graphite, by means of the processes known as electroplating, electroforming and also contact and immersion processes, more particularly it relates to such baths containing thiourea or its water soluble derivatives.

Metallic coatings of, for instance, silver, gold, copper, tin, lead and so on are prepared in baths containing large quantities of cyanides, especially potassium cyanide. The working with the very poisonous cyanides necessitates extreme precautions in spite of which poisoning of the workmen very often occurs.

According to the present invention instead of the cyanides used heretofore, thiourea or water soluble derivatives thereof, such as methyl thiourea, is added to the liquid from which a metal is deposited. The working method is the usual one known from the processes using cyanide. Generally, for each gram of metal salt about 1 to 4 grams of thiourea or a water soluble derivative thereof are employed. The concentration of the bath is about as follows: 5 to 30 grams of metal salt and 5 to 60 grams of thiourea or a water soluble derivative thereof dissolved in one liter of water. In some cases also higher concentrations come into consideration. The usual additions to the bath are the same as in the processes using cyanide. Small quantities of acids, such as hydrochloric acid and acetic acid and also salts, such as ammonium acetate and formate may be added. The temperature of the baths is the same as in the cyanide processes. Generally the process is effected at normal temperature of about 15–20° C. but also higher temperatures up to about 50° C. may be applied. When effecting electroforming or electroplating processes the current conditions are about 0.5–8.0 volts and 0.1–1.0 ampere per square decimeter.

The following examples illustrate the invention which is not, however, restricted thereto.

Example 1

30 grams of thiourea and 9 to 10 grams of silver nitrate are dissolved in one liter of water. The objects to be coated are brought into the bath whereby they serve as the cathode. A 2-volt accumulator suffices as current supply.

Example 2

40 grams of thiourea and 20 grams of nickel sulfate are dissolved in one liter of water and 1 gram of acetic acid is added. The objects to be coated are brought into this bath. A 4-volt accumulator serves as current supply. The current density amounts to 0.3 ampere per square decimeter.

Example 3

20 grams of thiourea and 15 grams of zinc sulfate are dissolved in one liter of water and 20 grams of ammonium acetate are added. The objects to be coated are brought into this bath. A 4-volt accumulator serves as current supply. The current density amounts to about 0.2 ampere per square decimeter.

Example 4

30 grams of thiourea and 15 grams of lead nitrate are dissolved in one liter of water and 30 grams of ammonium acetate and 8 to 10 grams of glue are added. The objects to be coated are brought into this bath. A 4-volt accumulator serves as current supply. The current density amounts to about 0.3 ampere per square decimeter.

Example 5

10 grams of thiourea and 5 grams of mercury chloride are dissolved in one liter of water. This bath serves as quickening bath.

*Example 6*

10 grams of lead acetate and 15 grams of thiourea are dissolved in one liter of water. Mechanically well purified iron is brought into this solution. The iron is slowly covered with a strongly adhesive layer of lead. After remaining from 1 to 2 hours in this bath, the layer of lead will be thick enough to protect the iron from rusting in the air.

I claim:—

1. In the process of depositing a metal on metallic surfaces from an aqueous solution, the step which comprises effecting the process in the presence of a compound of the group consisting of thiourea and water soluble derivatives thereof.

2. In the process of depositing a metal on metallic surfaces from an aqueous solution, the step which comprises effecting the process in the presence of a compound of the group consisting of thiourea and methyl thiourea.

3. In the process of depositing a metal on metallic surfaces from an aqueous solution, the step which comprises effecting the process in the presence of thiourea.

4. In the process of depositing a metal on metallic surfaces from an aqueous solution by means of an electric current, the step which comprises effecting the process in the presence of a compound of the group consisting of thiourea and water soluble derivatives thereof.

5. In the process of depositing a metal on metallic surfaces from an aqueous solution by means of an electric current, the step which comprises effecting the process in the presence of a compound of the group consisting of thiourea and methyl thiourea.

6. In the process of depositing a metal on metallic surfaces from an aqueous solution by means of an electric current, the step which comprises effecting the process in the presence of thiourea.

In testimony whereof, I affix my signature.

HEINRICH GOCKEL.